(12) United States Patent
Kutz et al.

(10) Patent No.: US 6,707,595 B2
(45) Date of Patent: Mar. 16, 2004

(54) MICRO-MECHANICAL POLARIZATION-BASED MODULATOR

(75) Inventors: Andrew F. Kutz, Rochester, NY (US); Sujatha Ramanujan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/351,764

(22) Filed: Jan. 27, 2003

(65) Prior Publication Data

US 2003/0161029 A1 Aug. 28, 2003

Related U.S. Application Data

(62) Division of application No. 10/084,716, filed on Feb. 26, 2002, now Pat. No. 6,590,695.

(51) Int. Cl.[7] ............................................. G02B 26/00
(52) U.S. Cl. ........................ 359/291; 359/298; 359/259
(58) Field of Search ........................... 359/259, 295, 359/245, 291, 298, 256, 301, 247–258, 483; 310/36, 90, 309; 73/504.02, 504.12, 204.09, 514.17; 257/418, 470

(56) References Cited

U.S. PATENT DOCUMENTS

| 2,403,731 A | 7/1946 | MacNeille | 359/488 |
|---|---|---|---|
| 4,544,237 A | 10/1985 | Gagnon | 349/9 |
| 4,688,897 A | 8/1987 | Grinberg et al. | 349/162 |
| 4,701,028 A | 10/1987 | Clerc et al. | 349/162 |
| 4,707,081 A | 11/1987 | Mir | 359/254 |
| 4,887,104 A | 12/1989 | Kitano et al. | 359/216 |
| 5,039,185 A | 8/1991 | Uchida et al. | 349/119 |
| 5,061,049 A | 10/1991 | Hornbeck | 359/224 |
| 5,233,459 A | 8/1993 | Bozler et al. | 359/230 |
| 5,252,881 A | 10/1993 | Muller et al. | 310/309 |
| 5,281,562 A | 1/1994 | Araujo et al. | 501/32 |
| 5,311,360 A | 5/1994 | Bloom et al. | 359/572 |
| 5,375,006 A | 12/1994 | Haas | 349/120 |
| 5,402,154 A | 3/1995 | Shibaguchi et al. | 349/256 |

(List continued on next page.)

OTHER PUBLICATIONS

I. Richter, P. Sun, F. Xu, and Y. Fainman; Design Considerations of Form Birefringent Microstructures; Applied Optics, vol. 34, No. 14, May 10, 1995, pp. 2421–2429.

(List continued on next page.)

*Primary Examiner*—Jordan M. Schwartz
*Assistant Examiner*—Jessica Stultz
(74) *Attorney, Agent, or Firm*—Nelson Adrian Blish (57) ABSTRACT

A micro-mechanical spatial light modulator for modulating a polarization state of an incident beam (20) comprises a plurality of rotatable elements. Each of the rotatable elements (170) comprises a plurality of structures (300). The structures are spaced apart at sub-wavelength distances relative to the wavelength of the incident beam (20). Each of the plurality of structures (300) exhibits an interaction with the polarization state of the incident beam. An actuator is coupled to each of the rotatable elements. The actuator is capable of controllably positioning the rotatable element to any two positions, and each of the positions has a corresponding polarization state. A substrate (110) supports each plurality of rotatable elements and houses each actuator.

9 Claims, 6 Drawing Sheets

U.S. PATENT DOCUMENTS

| | | | | |
|---|---|---|---|---|
| 5,459,602 | A | | 10/1995 | Sampsell ................... 359/234 |
| 5,517,356 | A | | 5/1996 | Araujo et al. ............... 359/490 |
| 5,543,958 | A | * | 8/1996 | Lebby et al. ............... 359/254 |
| 5,552,925 | A | | 9/1996 | Worley ...................... 359/230 |
| 5,652,667 | A | | 7/1997 | Kurogane .................... 349/42 |
| 5,705,318 | A | | 1/1998 | Mehregany et al. ........ 430/312 |
| 5,710,466 | A | | 1/1998 | Allen et al. ........... 310/40 MM |
| 5,844,722 | A | | 12/1998 | Stephens et al. ............. 359/637 |
| 5,847,789 | A | | 12/1998 | Nakamura et al. ............ 349/99 |
| 5,909,069 | A | | 6/1999 | Allen et al. ........... 310/40 MM |
| 5,912,762 | A | | 6/1999 | Li et al. .................... 359/352 |
| 6,029,337 | A | | 2/2000 | Mehregany et al. .......... 29/598 |
| 6,049,428 | A | | 4/2000 | Khan et al. ................. 359/491 |
| 6,081,312 | A | | 6/2000 | Aminaka et al. ........... 349/118 |
| 6,122,103 | A | | 9/2000 | Perkins et al. ............. 359/486 |
| 6,243,199 | B1 | | 6/2001 | Hansen et al. .............. 359/486 |
| 6,285,488 | B1 | * | 9/2001 | Sandstrom .................. 359/290 |
| 6,307,663 | B1 | | 10/2001 | Kowarz ...................... 359/231 |
| 6,515,785 | B1 | * | 2/2003 | Cobb et al. ................. 359/247 |
| 2003/0025882 | A1 | * | 2/2003 | Heine ......................... 353/31 |

OTHER PUBLICATIONS

M. Scalora, M.J. Bloemer, A.S. Pethel, J.P. Dowling, C.M. Bowden, and A.S. Manka; Transparent Metallo–Dielectric, One–Dimensional, Photonic Band–Gap Structures; 1998 American Institute of Physics, pp. 2377–2383.

R. Tyan, A. Salvekar, H. Chou, C. Cheng, A. Scherer, P. Sun, F. Xu, and Y. Fainman; Design Fabrication, and Characterization of Form–Birefringent Multilayer Polarizing Beam Splitter; 1997 Optical Society of America, pp. 1627–1636.

* cited by examiner

MICRO-MECHANICAL POLARIZATION-BASED MODULATOR

CROSS REFERENCE TO RELATED APPLICATIONS

This is a divisional of application Ser. No. 10/084,716, filed Feb. 26, 2002 now U.S. Pat. No. 6,590,695.

FIELD OF THE INVENTION

This invention generally relates to spatial light modulators and in particular relates to a polarization-based modulator comprising an array of micro-mechanical assemblies.

BACKGROUND OF THE INVENTION

Spatial light modulators have been adapted for use in a range of imaging applications, particularly in projection and printing apparatus. In operation, a spatial light modulator array provides a pattern of individual light modulators, each modulator typically corresponding to a pixel for representing a two-dimensional image. Light can be modulated by modifying the incident light according to selective absorption, reflection, polarization state change, beam steering, diffraction, wavelength separation, and coherence modification. Typically, the interaction of the light and modulator is enabled using electro-optic or acousto-optic materials, or a micro-mechanical structure, patterned with a series of addressing electrodes.

In particular, the liquid crystal display (LCD) is a widely used type of spatial light modulator, which operates by the modulation of the polarization state of incident light. LCDs are commonly used in laptop computer displays, pagers, and game displays, as well as in projection and printing systems. LCD spatial light modulators are available in a range of types and may use any of a number of underlying technologies, including devices using nematic, twisted nematic, cholesteric, smectic, and vertically aligned liquid crystal molecules. LCDs are described in numerous patents, including for example, U.S. Pat. No. 4,688,897 (Grinberg et al.); U.S. Pat. No. 5,039,185 (Uchida et al.); U.S. Pat. No. 5,652,667 (Kuragane); and U.S. Pat. No. 5,847,789 (Nakamura et al.). LCDs are also available in a wide range of sizes, from devices suited to micro-displays to devices used for direct view laptops. LCD performance characteristics, such as response time, angular acceptance, contrast, and control voltages, vary depending on the device.

Spatial light modulators that alter the polarization state of incident light have also been constructed using lead lanthanum zirconium titanate (PLZT), as described in U.S. Pat. No. 4,707,081 (Mir), U.S. Pat. No. 4,887,104 (Kitano et al.), and U.S. Pat. No. 5,402,154 (Shibaguchi et al.). While PLZT devices are robust relative to optical damage thresholds, these devices typically have modest modulation speeds (kHz range), require high drive voltages, and have electro-optic response curves with significant hysteresis.

LCD and PLZT devices are suitable for many applications, but have a number of inherent disadvantages, including relatively slow response times (typically a few ms) and significant optical response variations relative to the angle of incidence. Most LCD modulators are unable to provide both high modulation contrast and fast modulation speeds simultaneously. Modulation contrast not only varies with angle and wavelength, but can also be degraded by thermally induced stress birefringence when exposed to the large light loads common to projection applications. In demanding applications using LCDs, the systems are often enhanced through the use of carefully designed polarization compensators (for example see U.S. Pat. No. 4,701,028 (Clerc et al.) and U.S. Pat. No. 6,081,312 (Aminaka et al.), which boost contrast, but at the cost of additional optics to the system.

One approach to providing spatial light modulators with improved response time is to adapt micro-mechanical devices to this task. The digital micro-mirror device (DMD) from Texas Instruments, Dallas, Tex., as disclosed in U.S. Pat. No. 5,061,049 (Hornbeck), is one such device, which modulates by beam steering the incident light relative to the imaging optics. Micro-mechanical gratings, including the grating light valve (GLV), disclosed in U.S. Pat. No. 5,311,360 (Bloom), and the conformal grating modulator, disclosed in U.S. Pat. No. 6,307,663 (Kowarz), have been successfully developed. These gratings impart a phase pattern to the incident light, causing it to diffract when modulated. Both the micro-mirror and the grating modulators require the use of a Schlieren type optical system, with blocking apertures or angular separation, to distinguish between the modulated and un-modulated light. Alternately, a spatial light modulator with rolling micro-mechanical shutters is described in U.S. Pat. No. 5,233,459 (Bozler et al), which either blocks or transmits the incident light, according to the control signals. As compared to the electro-optical or acousto-optical devices, the micro-mechanical modulators typically provide a more uniform response, both within a device (from pixel to pixel) and relative to the properties of the incident light (angle of incidence, wavelength, etc.). The micro-mechanical optical modulators also typically provide faster response times (On to Off, and visa-versa) than do many of the electro-optical devices. While these devices have provided some improvements in performance, there is room for improvement. For example, DMD devices are capable of achieving higher speeds, but are presently limited in achieving high resolution, and limit the input light to a modest angular beam width (<10° or <F/3.0). By comparison, the GLV and related devices are generally limited to one dimensional structures, due to optical fill factor issues between adjacent rows.

While micro-mechanics have been applied to light modulation using beam steering, diffraction, and beam blocking mechanisms, there are further opportunities to bring the advantages of micro-mechanical (MEMS) structures to the area of optical modulation. In particular, an improved polarization modulator could be designed, with potentially faster response times and more uniform angular and wavelength responses as compared to some of the conventional electro-optical devices.

Micro-mechanical structures, which might be adaptable to the construction of a micro-mechanical polarization modulator, have been described, including motors, rotors, and mini-turbines. Exemplary structures and manufacturing processes for micro-motors are discussed in numerous prior art patents, including U.S. Pat. No. 5,252,881 (Muller et al.), U.S. Pat. Nos. 5,710,466 and 5,909,069 (both to Allen et al.), and U.S. Pat. No. 5,705,318 (Mehregany et al.). Micro-motors have been fabricated and tested on a scale as small as 60–100 $\mu$m diameter, which is of a size appropriate for building a pixilated spatial light modulator, although smaller motor diameters could be useful. U.S. Pat. No. 5,459,602 (Sampsell) and U.S. Pat. No. 5,552,925 (Worley) describe micro-motors that are adapted with revolving blade shutters. Alternately, U.S. Pat. No. 6,029,337 (Mehregany et al.) describes a micro-motor structured to facilitate the creation of a variety of devices, including a micro-polygon scanner and micro-grating optical scanner. In particular, FIG. 4 of U.S. Pat. No. 6,029,337 illustrates the concept of a rotating diffraction grating (long pitch (p>>λ)), mounted to a micro-motor, and used in an optical scanner. These devices, operating at rotational speeds up to 50,000 rpm (1.2 msec/rev.), can be used in optical systems for a variety of applications, including bar code scanners and laser printers.

However, U.S. Pat. No. 6,029,337 neither describes the design and construction of a micro-mechanical polarization spatial light modulator, nor anticipates the potential advantages of such a device and its application within a modulation optical system. In particular, such a device is necessarily fabricated with a surface structure that alters the polarization state of the incident light in accordance with it rotational position. Traditionally, optical polarizers have been constructed with bulk materials, such as crystal calcite, or as the Polaroid type dye sheets with stretched polymers, or as optical thin films within glass substrates (U.S. Pat. No. 2,403,731 (MacNielle)), or finally as aligned metallic needles embedded in a glass medium (U.S. Pat. No. 5,281,562 (Araujo et al.) and U.S. Pat. No. 5,517,356 (Araujo et al.). Although these various types of polarizers are valuable in their own right, they do not lend themselves to integration with a micro-mechanical structure. In particular, these types of polarizers tend to be both large in scale (millimeters and centimeters in extent) and use fabrication processes not conducive to the miniaturization. Furthermore, even if these polarizer types were fabricated on the sub-millimeter scale, they are not readily attached or integrated onto a micro-mechanical device.

Polarizers can however be manufactured with processes that lend themselves to modem manufacturing techniques for miniaturization and patterning. Furthermore, such polarizers can be manufactured for the visible wavelength range, rather than the infra-red wavelength range, where such form-birefringent and form-dichroic structures were previously limited. Form-birefringent, all dielectric, sub-wavelength structures have been developed for use as polarization sensitive mirrors, polarizing beamsplitters, and waveplates. In such structures, a sub-wavelength grating structure is formed in a dielectric material, with various parameters, including the pattern, groove period, groove profile, and groove depth, determining the performance of the device. As an example, the paper "Design considerations of form-birefringent microstructures", I. Richter et al., Applied Optics, Vol. 34, No. 14, pp. 2421–2429, May 1995, discusses many of the design compromises and issues in the design of such structures.

Optical polarizers with sub-wavelength structures can also be designed and fabricated with mixed metal-dielectric structures. In particular, U.S. Pat. No. 6,122,103 (Perkins et al) and U.S. Pat. No. 6,243,199 (Hansen et al) describe visible wavelength wire grid polarizers and polarization beamsplitters fabricated from sub-wavelength metallic wire deposited on a glass substrate. As compared to the all dielectric devices, the wire grid devices typically provide greater differences in response (higher contrast) for the transmitted polarization vs. the reflected polarization. However, both the dielectric-form-birefringent polarizers and the wire grid polarizers generally provide polarization responses that are generally uniform over extended wavelength ranges and large ranges of incident angles.

In general, the use of dielectric-form-birefringent polarizers and the wire grid polarizers has been applied to static optical devices, such as waveplates, polarizers, and polarization beamsplitters, which reside in a pre-determined position within an optical system. Spatial light modulators, such as liquid crystal displays, may also exist within these systems, and provide the actual data input modulation. However, the operation of such systems is then typically limited by the polarization response of the liquid crystal displays, and the full polarization response of the sub-wavelength structured polarizer is under utilized. If, on the other hand, the use of sub-wavelength structure polarizers were applied to the construction of the modulator itself, the overall response of the optical systems could be improved. In particular, there has been no attempt to adapt sub-wavelength structured optical retarders and polarizers in the construction of spatial light modulators using micro motors.

Thus it can be seen that there is an opportunity for a spatial light modulator that operates by polarization modulation, employing sub-wavelength structured optical polarizers controlled by micro-mechanical actuators, which are preferably micro-mechanical micro-motors.

SUMMARY OF THE INVENTION

It is an object of the present invention to provide a spatial light modulator for modulating the polarization state of an incident beam.

Briefly, according to one aspect of the present invention a micro-mechanical spatial light modulator for modulating a polarization state of an incident beam comprises a plurality of rotatable elements. Each rotatable element comprises a plurality of structures. The structures are spaced apart within sub-wavelength distances relative to the wavelength of the incident beam. Each of the plurality of structures exhibits an interaction with the polarization state of the incident beam. A micro-motor is coupled to each of the rotatable elements. The micro-motor is capable of controllably positioning the rotatable element to at least two positions. Each position has a corresponding polarization state. A substrate structure supports each of the plurality of rotatable elements and houses each micro-motor.

A feature of the present invention is that it provides an array of micro-mechanical structures comprising sub-wavelength optical polarization modulators arranged in a two-dimensional array, wherein each modulator is independently actuated by a micro-mechanical micro-motor.

It is an advantage of the present invention that it provides a spatial light modulator that is capable of providing uniform angular response with fast response times.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1A:
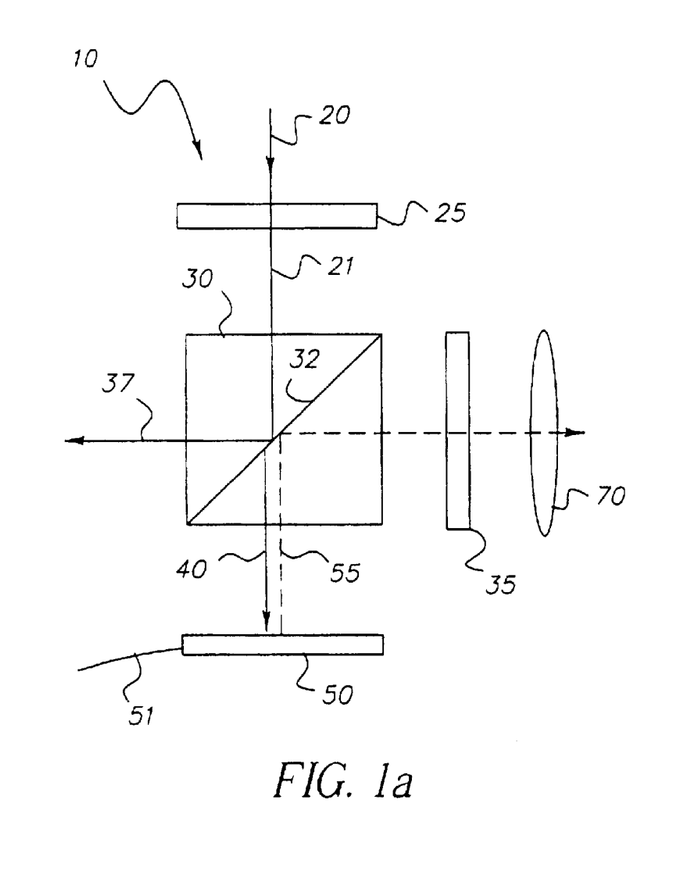
FIG. 1a shows a view in cross section of a modulation optical system, containing a spatial light modulator according to the present invention, showing its operation upon incident light.

Referring to FIG. 1a, a spatial light modulator array 50 according to the present invention functions as an optical modulator which alters the polarization state of incident light. Modulation optical system 10 comprises a pre-polarizer 25, a polarization beamsplitter 30, spatial light modulator array 50, polarization analyzer 35, and a projection lens 70. Typically, projection lens 70 directs light to a distant target plane (not shown) to form an image of the spatial light modulator array 50. Modulation optical system 10 may comprise a portion of an electronic projection system or an image printing system. However, modulation optical system 10 may be applied to other uses, such as for example, an optical character recognition system.

An incident light beam 20 originates from a light source (not shown), which for example may be an arc lamp (such as xenon or metal halide), a halogen or incandescent lamp, one or more LEDs (light emitting diodes), or a laser. Typically the incident light beam 20 is modified and shaped by an illumination system (not shown), which may include condensing optics, light homogenizers, such as fly's eye integrators, light pipes, fiber optic bundles, or kaleidoscopes. With the exception of the laser, these light sources typically emit un-polarized light, and thus modulation optical system 10 is equipped with a pre-polarizer 25, which defines the preferred polarization state for incident light beam 20, while typically retro-reflecting light of the opposite polarization state back towards the light source. Additionally, a polarization converter may be used to selectively alter the light of the rejected opposite polarization state to match the desired polarization state, and then re-combine this light with larger flux.

Polarized light beam 21 is directed upon polarization beamsplitter 30, which splits this light into a transmitted polarized light beam 40 of one polarization state, and a reflected light beam 37 of the opposite polarization state in accordance to the properties of its internal polarizing filter layer 32. For example, polarization beamsplitter 30 may be a MacNielle type prism (reference U.S. Pat. No. 2,403,371) which nominally transmits "p" polarized light and reflects "s" polarized light. Typically the "p" polarized transmitted light becomes the transmitted polarized light beam 40 which is directed onto the light modulator 50, as the polarization contrast (Tp/Ts) for this transmitted light is higher than the polarization contrast for the reflected light (Rs/Rp). This low contrast reflected light becomes reflected light beam 37, which is generally directed out of the modulation optical system 10. Depending on the application and design, reflected light beam 37 may be directed into a light trap, onto another light modulator, or recycled back to the light source.

As polarization beamsplitter 30 separates the incident light beam according to polarization, it can also function as the pre-polarizer for modulation optical system 10. In actuality, both pre-polarizer 25 and polarization analyzer 35 are optional for use in modulation optical system 10, with their inclusion dependent upon the system contrast specification and the properties of the incident light (wavelength band, numerical aperture, innate polarization state, etc.). Both pre-polarizer 25 and polarization analyzer 35 may be a stretched polymer dye sheet polarizer (such as the original Polaroid polarizer, or more recently, the polarizer of U.S. Pat. No. 6,049,428), a wire grid polarizer (reference U.S. Pat. No. 6,122,103), a MacNielle type polarization prism, or any one of several other types of appropriate optical polarizers. Depending on the polarizer used, the rejected polarization state light is either reflected or absorbed. On the other hand, polarization beamsplitter 30 cannot absorb the rejected polarization state light, but must reflect one state, and transmit the opposite state, along directions separate both from each other and from the incident light. While polarization beamsplitter 30 may be of the MacNielle type, other polarization beamsplitter types may be included in modulation optical system, including the PTIR prism (reference U.S. Pat. No. 5,912,762), the liquid prism (reference U.S. Pat. Nos. 4,544,237 and 5,844,722), and the wire grid polarization beamsplitter (reference U.S. Pat. No. 6,243,199).

Using the construction provided in FIG. 1a for modulation optical system 10, incident light beam 20 is transmitted through polarization beamsplitter 30, forming a transmitted polarized light beam 40 (typically "p" state polarized), which is directed onto spatial light modulator array 50. Spatial light modulator array 50 then modulates the polarized incident light beam 40 on a pixel by pixel basis in accordance with the applied drive signal 51, by rotating the polarization state of the incident light. Drive signal 51 may be provided by a video board, raster image processor, or other data sources such as is well known in the art. Relative to FIG. 1a, the modulated On-state 55 light is "s" polarized, and after reflection off spatial light modulator array 50, this light reflects off the internal polarizing filter layer 32 within polarization beamsplitter 30, and passes through polarization analyzer 35 and projection lens 70. The unmodulated Off-state light is light that remains "p" polarized. After reflection off of spatial light modulator array 50, this unmodulated "p" polarized Off-state light is transmitted through the internal polarizing filter layer 32 of polarization beamsplitter 30. Thus, the Off-state light is transmitted straight through polarization beamsplitter 30, such that it travels back along the optical path of incident light beam 20, and is generally directed back towards the light source.

The contrast between the modulated On state and unmodulated Off state light is determined by the performance characteristics of both the light modulator and the polarization optics. For example, the modulation contrast (On State/OffState) significantly depends on the residual amount of "s" state polarized light accompanying the Off state "p" polarized light. This residual "s" light can either be from leakage through the polarizing beamsplitter 30 or from incomplete rotation of the polarization vectors by spatial light modulator array 50. As the polarization response of both the light modulator and the polarization optics vary with wavelength and angular width (numerical aperture), the amount of residual leakage light of the unwanted polarization is likewise dependent on these conditions. In some optical systems, polarization compensators (for example, reference U.S. Pat. No. 5,375,006) are used to modify the polarization states of the transiting light in a pre-determined fashion vs. space or angle, so that the overall modulation contrast is increased. Additionally, depending on the performance characteristics of the spatial light modulator array 50, light may also be modulated to provide gray scale resolution, by driving the polarization rotation to intermediate amounts, such that both "s" state and "p" state light emerge from the modulator in controlled amounts.

Figure 2:
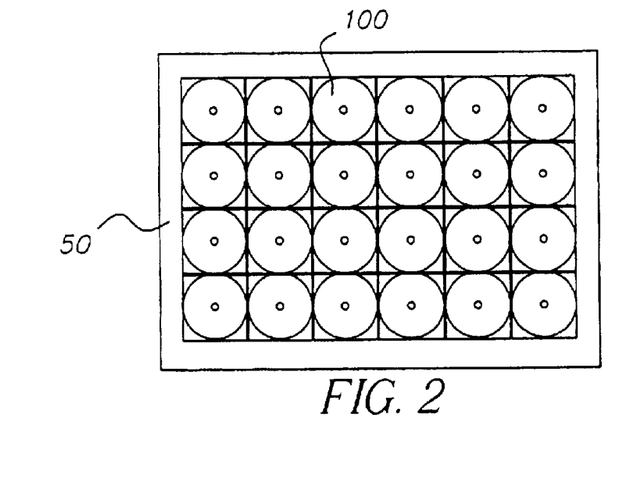
FIG. 2 is a plane view showing a portion of a micro-mechanical array according to the present invention.

Referring to FIG. 2, there is shown a plane view of spatial light modulator array 50 of the present invention, comprising an ordered arrangement of micro-mechanical polarization modulators 100. Each modulator (or pixel) 100 can be individually actuated to one of at least two angular positions (corresponding to ON and Off) in order to provide a predetermined polarization modulation to an incident light beam. It should be noted that for simplicity of illustration FIG. 2 shows only a portion of spatial light modulator array 50 containing merely 24 modulators 100, arranged in a 4×6 matrix. In a practical spatial light modulator array 50 for projection or printing use, for example, spatial light modulator array 50 might comprise an array of 1024×640 modulators 100. Each modulator 100 comprises both an optic 200, shown in more detail in FIG. 3, with polarization optical properties, and a micro-mechanical actuator to provide controlled motion in accordance with the drive signal 51.

Figure 3:
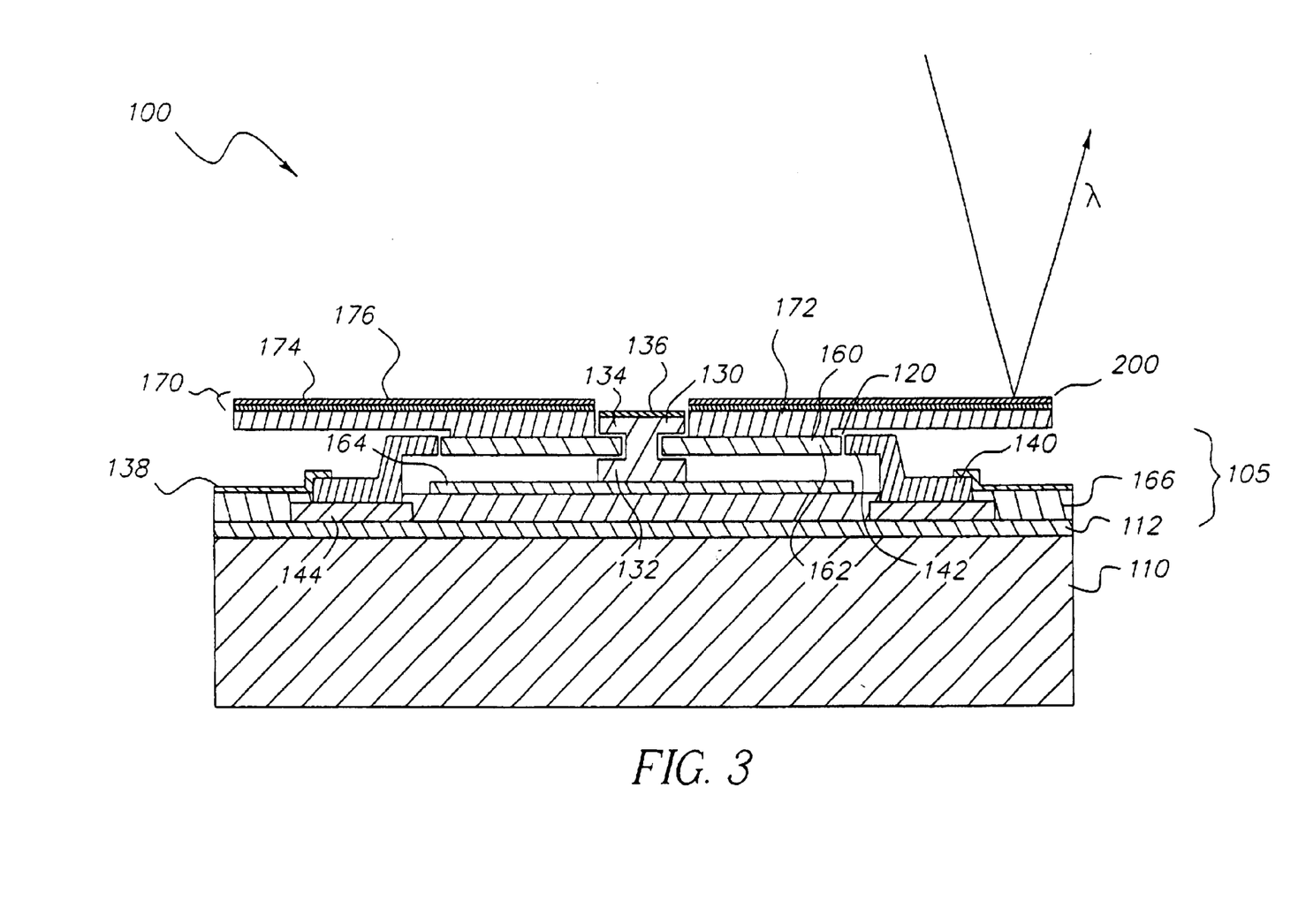
FIG. 3 is an enlarged cross sectional side view showing a single micro-mechanical modulator component that corresponds to a single image pixel.
Figure 4:
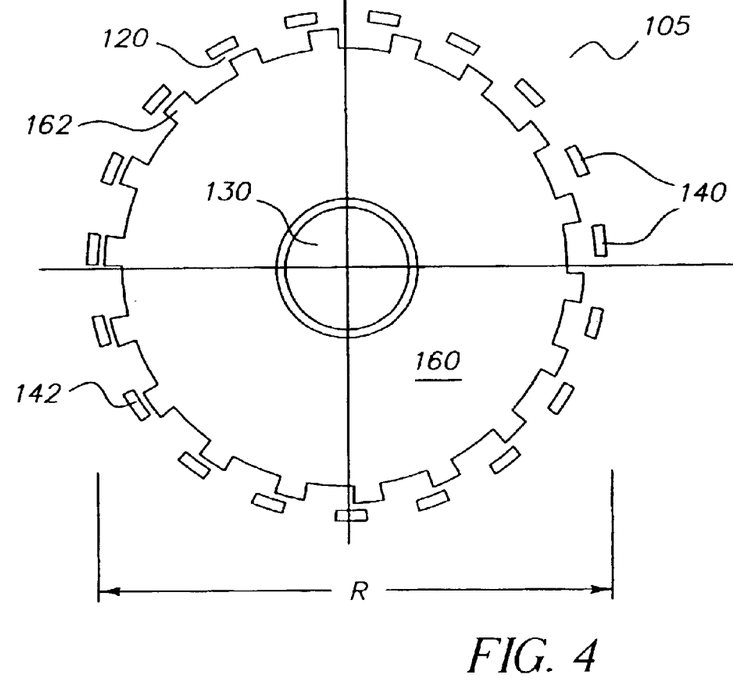
FIG. 4 is a plane view showing the underlying structure of a micro-mechanical micro-motor used in a preferred embodiment.

In a preferred embodiment, actuation of each modulator 100 is controlled by a micro-motor 105 as is shown in the cross-section view of FIG. 3 and in the plane view of FIG. 4. Micro-motor 105 as shown in FIG. 3 is a basic type of electrostatic micro-motor such as that disclosed in FIGS. 2 and 3 of U.S. Pat. No. 5,252,881 (Muller et al.) This design allows construction of micro-motor 105 having dimensions on the order of 200 microns or smaller as viewed in the flat plane view of FIG. 4. Micro-motor 105 is constructed on a substrate 110, typically polysilicon or other suitable material, with an intermediate layer 112 provided as an insulating layer. Intermediate layer 112 comprises a complex pattern of several layers, including both circuitry and insulating layers, to provide pixel/motor addressing, so that control signals can be introduced. Micro-motor 105 comprises a rotor 160 that rotates about a central flange bearing 130. A lower flange 132 and an upper flange 134 are provided to retain rotor 160 in place. An additional layer, mask 136, can be provided atop flange bearing 130. Stators 140, energized through stator leads 144, provide the electrostatic charge to stator poles 142 for driving rotation of rotor 160, with an air gap 120 separating stator poles 142 from rotor poles 162. As is shown in FIG. 4, rotor 160 comprises a number of rotor poles 162. An insulating layer 166 can be used to isolate a ground plane 164 from the stator leads 144.

Relative to spatial light modulator array 50, which comprises a multitude of modulators or pixels 100, each of these modulators 100 comprise both a micro-motor 105 and an optic 200, with a structure of optical layers 170. In the case of FIG. 3, these optical layers 170 comprise mask 136, polarization optical layer 176, and reflective layer 174. Polarization optical layer 176 and reflective layer 174 are mounted on top of a support 172, and support 172 is attached to rotor 160. Polarization optical layer 176 contains the birefringent polarizing structures, as described below. Reflective layer 174 is disposed between polarization optical layer 176 and support 172. Notably, support 172 is scaled to overhang rotor 160 and stator 140, in order to maximize the optical fill factor provided by modulator optical system 10. For the spatial light modulator array 50 of FIG. 2, in which each of the pixels 100 have optical layers covering a nominally circular area, while the pixels are laid out in a square grid, the maximal optical fill factor F is ~π/4~0.78. The fill factor would be further reduced by the exposed area of the flange bearing 130 and the designed gap between pixels in an array modulator device. Ideally, the modulator might be constructed with the optical layers 170 (and support 172) extending over the top of the flange bearing 130 (but without contacting it), so as to increase the optical fill factor. Otherwise, if the flange bearing is exposed, it may be desirable to overcoat it with a mask 136, which is provided to prevent a bright back reflection from this surface, which could otherwise reduce the modulation contrast from the device.

Mask 136 nominally either absorbs or diffusely scatters the incident light that falls on it. Similarly, the substructure of modulator 100 may include a light shield 138 disposed on some potentially illuminated internal surfaces of micro-motor 105. As with mask 136, light shield 138 either absorbs or diffusely scatters the incident light. For high contrast applications, light absorption would be preferred over light scattering. Furthermore, both mask 136 and light shield 138 may have a multi-layer structure, comprising for example, an anti-reflection (AR) coating deposited on a light absorbing (nominally black) layer. The AR coating would be provided to enhance the efficiency of light absorption. Of course, light absorption on significant portions of a spatial light modulator 50 constructed with these micro-motors 105 and optical layers 170, will cause heating of the packaged device, which could be a problem for high power applications.

Dimensionally, rotor 160 can be fabricated to be from 60–200 microns in diameter. Stator poles 142 would be approximately 8–20 microns in arcuate length. A nominal clearance (air gap 120) of 2.0 microns would be required between rotor poles 162 and stator poles 142, to permit interaction between the charged surfaces without having contact.

Figure 5:
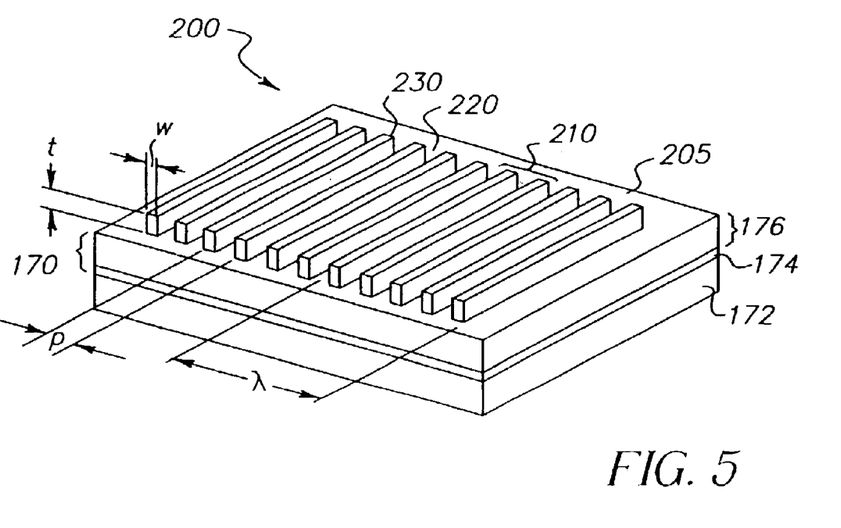
FIG. 5 provides a perspective view of a polarization optical layer constructed as a form-birefringent waveplate, which forms a portion of the micro-mechanical polarization modulator of the present invention.

The design and structure for optical layers 170 of pixel 100 are understood with respect to FIG. 5, to form an optic 200 with the desired polarization properties. Referring to FIG. 5, there is shown a polarization optical layer 176 which consists of a one dimensional arrangement of form-birefringent subwavelength optical micro-structures 210, which includes grooves 220 and mesas 230. The arrangement of optical micro-structures 210 is fabricated into a dielectric material 205, in the form of a series of grooves 220 etched or otherwise removed from the dielectric material 205, to form a pattern of mesas 230. Depending on the pattern of grooves 220 and mesas 230, as well as the their micro-structure (cross-sectional profile), the overall structure can exhibit form birefringence, and therefore function as a waveplate, providing phase change to an incident light beam. The optical micro-structure 210 is characterized by the pitch (p), width (w), and height or thickness (t) of the mesa/groove structure.

Unlike the bulk birefringence common in optical materials such as crystals, which is caused by the anisotropic variations in the electrical properties within the materials, form birefringence is caused by anisotropic patterns of sub-wavelength dielectric structures that impart phase changes to the light beam. As is known in the field, a two dimensional pattern of symmetrical dielectric sub-wavelength structures (mesas and grooves) can function similar to an anti-reflection (AR) coating, with a broad wavelength, polarization insensitive, and angle insensitive response. Such a structure is also known as a "moth's eye" structure, due to its presence in some varieties of moth's. An asymmetric two dimensional pattern (mesas and grooves different in X and Y) can provide a polarization sensitive anti-reflection structure. A one dimensional structure of grooves and mesas, like that of FIG. 5, can provide an optic with polarization functionality (a polarization sensitive mirror or a waveplate), as well as exceptional anti-reflection properties. As discussed in the paper, "Design considerations of form-birefringent microstructures", by I. Richter et al., (Applied Optics, Vol. 34, No. 14, pp. 2421–2429, May 1995), the detailed design of optical devices from form-birefringent micro-structures requires complex optical modeling. However, the Richter et al. paper also discusses many of the design parameters and compromises involved in developing form-birefringent structures, including methods for optimizing the amount of birefringence.

Relative to use in spatial light modulator 100, the optical micro-structures 210 of polarization optical layer 176 can be configured to fashion optic 200 into a waveplate. For sub-wavelength operation, the pitch (p) of the micro-structures should nominally be significantly less than the wavelength of incident light (p<<$\lambda$). However, practically speaking, a pitch of p~$\lambda$/10 provides nearly the optimal performance for most applications, while a pitch p~$\lambda$/4 is sufficiently sub-wavelength to gain most of the benefits for most applications, without significantly encountering any macro-structure optical effects (diffraction). In general, the phase change or birefringence provided by the optical micro-structure 210 can be tuned by controlling the characteristics of the groove and mesa structure. The delay (D) provided by the waveplate can be related to the thickness (t) of the mesas 230, according to equation (1):

$$t = D * \lambda / \Delta n, \quad (1)$$

where $\Delta n$ is the index change (birefringence) provided by the structure. The birefringence for the optical micro-structure of grooves 220 and mesas 230 can be approximated by equation (2);

$$\Delta n = n_\parallel - n_\perp = (w/p + (1-w/p)/n^2)^{1/2} - (w/p + n^2)*(1-w/p)^{1/2}, \quad (2)$$

and the retardation phase change $\Delta \phi$ can calculated by equation (3);

$$\Delta \phi = 2\pi * t * \Delta n / \lambda, \quad (3)$$

where n is the nominal index of refraction of the dielectric material 205. While the duty cycle (w/p) of the mesa width (w) to the pitch (p) can range from 0.0 to 1.0, optimal performance (maximum phase change or birefringence) can be found for duty cycles ranging from ~0.4 to ~0.6. The theoretical maximum birefringence possible, at a duty cycle of 0.5, for a low index (n=1.46) optical medium such as fused silica, is $\Delta n = 0.084$.

For the purposes of the design of spatial light modulator 100, it is desirable that the optic 200 fabricated on micro-motor 105 be a quarter wave plate, and in particular a quarter wave linear retarder. By comparison, the nominal maximum retardance, provided by the liquid crystal layer of a vertically aligned reflective LCD, is also a quarter wave. In this case, using the above equations indicates that to provide a quarter wave plate in green light ($\lambda$=0.55 $\mu$m), the delay (d) is ¼, the nominal thickness (t) or height of the mesas 230 is ~1.6 $\mu$m, and the retardation phase change $\Delta \phi$ provided is $\pi/2$. Assuming this exemplary device a pitch p~$\lambda$/4, the nominal width (w) of mesas 230 is ~69 nm. As a result, the optical micro-structure 210 for a form-birefringent waveplate using low index materials (such as $SiO_2$) requires a large height to width aspect ratio (23:1 for this example). With such deep grooves, device fabrication can be difficult. If a dielectric material 205 with a larger refractive index (n) can be used, the index change ($\Delta n$) from the form birefringence is larger, and the groove depth can be reduced for the same delay (D).

While the mesas 230 of FIG. 5 are illustrated as having a rectangular profile, it should be understood that other profiles are possible, and in some cases, advantageous. In particular, gradually tapering or triangular structures will provide improved transmission (lower reflectivity), but also less phase change. Depending on the desired design, exchanging increased efficiency for reduced phase change may be acceptable. In general, these form birefringent optical micro-structures 210 which define optic 200 as a waveplate, provide a uniform response (nearly constant retardance) for the incident light over a large range of incident angles (~+/−20°).

In addition to the polarization optical layer 176, the optical layers 170 of pixel 100 also include a reflective layer 174. In operation, the incident light passes through polarization optical layer 176, and gains the appropriate phase change in accordance with the design of the optical micro-structure 210, and the rotational position of the device relative the polarization state of the light. The light than reflects off reflective layer 174, and passes through polarization optical layer 176, thereby gaining additional phase change. The reflective layer 174 can either be a thin metallic coating, or a multi-layer dielectric high reflectance (HR) coating, as long as it provides a high reflectivity and low scatter. In order to minimize fabrication process steps, reflective layer 174 is most likely a coated metal layer. The thickness of this metal layer is nominally required to be at least as thick as the skin depth ($\delta$). Incident light is considered to only propagate through a metal film only a short distance, known as the skin depth ($\delta$), before reflection occurs. Skin depth can be calculated by equation (4) as follows:

$$\delta = \lambda / 4\pi n_i, \quad (4)$$

where the calculated depth corresponds to the distance at which the light intensity has decreased to ~$1/e^2$ of its value at the input surface (where $n_i$ is the imaginary part of the refractive index). Traditionally, thin metal layers are considered opaque relative to transmitted visible light when their thicknesses exceed the typical skin depth ($\delta$) values, which for metals such as aluminum or silver, are only 10–15 nm.

Figure 6A:
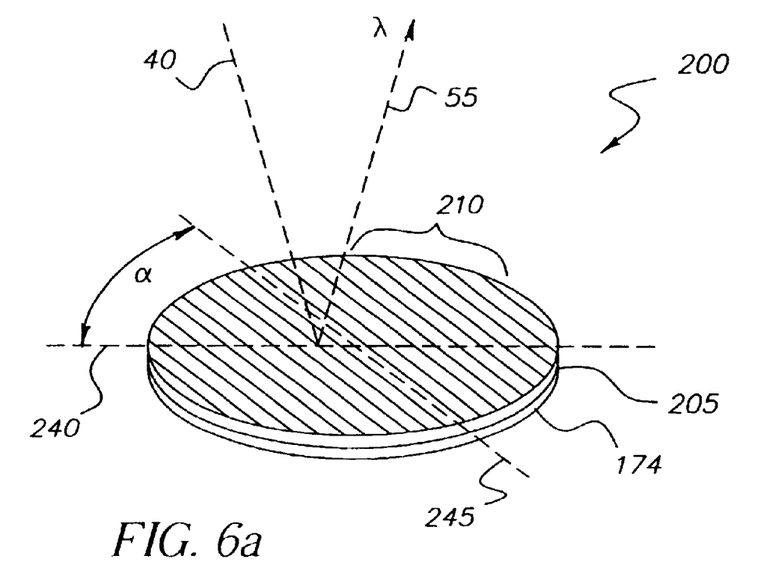
FIGS. 6a and 6b show the operation of the micro-mechanical modulator and its interaction with an incident light beam for two polarization states.
Figure 6B:
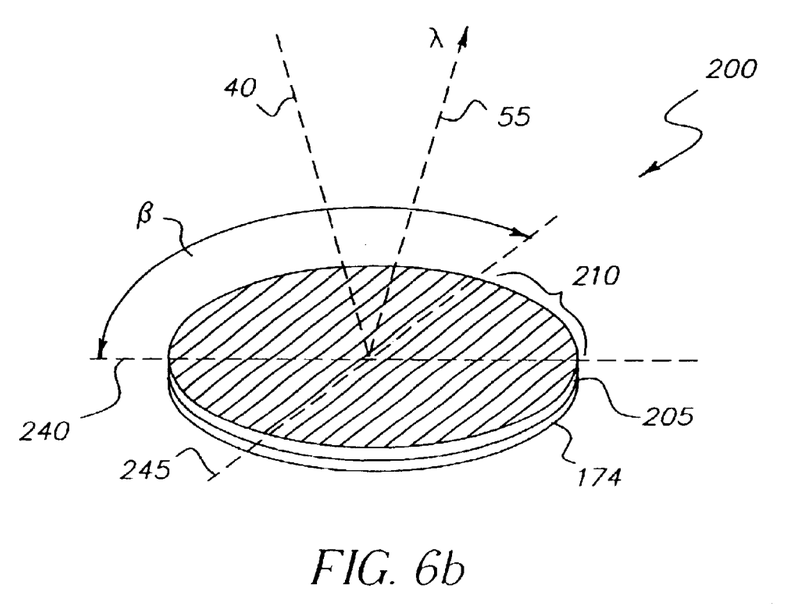

Referring to FIGS. 6a and 6b, there is shown how rotation of optic 200, mounted to micro-motor 105, provides modulation for light that is directed to a single pixel 100. Depending on the rotation of the micro-motor, the local polarization axis 245 of optic 200 may be aligned parallel to the system polarization axis 240, perpendicular to it, or at some intermediate angle (shown as α in FIG. 6a, or β in FIG. 6b). The system polarization axis 240 may correspond to the OFF state (if the polarization beam splitter 30 and polarization analyzer 35 are crossed) or the ON state (if the polarization beam splitter 30 and polarization analyzer 35 are aligned).

The transmitted polarized light beam 40 encounters the optical layers 170, shown in FIG. 5, of optic 200, including the dielectric material 205 with its pattern of optical microstructures 210, and reflective layer 174. Optic 200 is nominally a quarter wave linear retarder plate, which polarized incident light beam 40 encounters twice (both before and after reflection from reflective layer 174) in the process of becoming modulated light beam 55. As a result, if optic 200, is constructed as a quarter wave plate, it functions as a halfwave plate. This means that when its local optical axis is 245 located at 45° relative to the system optical axis 240, the polarization state of the polarized incident light beam 40 can be rotated a full 90° (from On State to Off State, for example). FIG. 6a shows this case, where angle α corresponds to 45°. FIG. 6b shows another case, where the optic 200 is rotated to an intermediate angle β. When polarized incident light beam 40 encounters optic 200 at an intermediate angle, the rotation of the polarization state will be partial, and the resulting light will be elliptically polarized. When this modulated light beam 55 then encounters the polarization analyzer 35 of modulation optical system 10, the intensity of the transmitted light will emerge at an intermediate level dark and light (Off and On), thus providing intermediate levels of brightness for the corresponding pixel.

Strictly speaking, it is not required that when optic 200 is a retarding waveplate, that it be constructed as a quarter wave plate. For example, optic 200 could have 1¼ waves of retardance and still function in the same manner. However, as the aspect ratio (height to width) of mesas 230 (or groove depth) would greatly increase, this is not advantageous. Alternately, optic 200 could be a half-wave plate (effectively a full wave plate with the reflection) and operate in a similar manner, but then the gray scale resolution (ability to hit intermediate brightness values) would likely be reduced.

Gray scale resolution also depends on the discrete rotational resolution of micro-motor 105, as a function of the number and positioning of stator poles 142 and rotor poles 162 and of drive signal phasing. As is disclosed in U.S. Pat. No. 5,909,069 (Allen et al.), a three-phase device having twelve stator poles 142 and ten rotor poles 162 would provide 30 steps per rotation, at 12 degrees per step. This corresponds to only 15 discrete steps or levels from one on-state to the next on-state, or ~8 steps from on-state to off-state. By using drive signal phase control, the micro-motor may be driven to intermediate rotational positions, which do not correspond to precise rotor to stator alignment, thereby increasing the number of steps per rotation. The actual minimum step size will then depend on the dynamics of the micro-motor and the sophistication of the drive signal phase control.

Unlike many of the other suggested applications for micro-motors where the motors operate at speed for a period of time, in this application, where micro-motor 105 enables the construction of a micro-mechanical polarization light modulator, the operational conditions require a continuing series of rapid accelerations and de-accelerations. FIG. 9 of U.S. Pat. No. 6,029,337 provides one example of a step response for a loaded micro-motor, where the device can rotate through 15° in ~1 msec. It is then realistic to anticipate that the device of the present invention can be operated as a polarization modulator with response times of a few msec per step. Actuation times could decrease if each pixel 100 of the device (spatial light modulator 50) could be driven bi-directionally rather than uni-directionally. Actuation times could further decrease if it is not required to drive the pixels past a reference position, such as an on state or off state position, to get from one gray scale code to another.

In general, the invention provides a spatial light modulator having modest pixel resolution and a fill factor approaching 75%. Gray scale resolution may be somewhat limited, depending on the number of controllable steps per rotation. However, the apparatus of the present invention provides a favorable response time and uniform angular response over a large range of incident angles.

There are a number of alternatives for mechanical actuation of the micro-motor 105. These include configurations using an outer rotor, magnetic micro-motors such as is disclosed in U.S. Pat. No. 5,710,466 (Allen et al.), and other devices.

Figure 7:
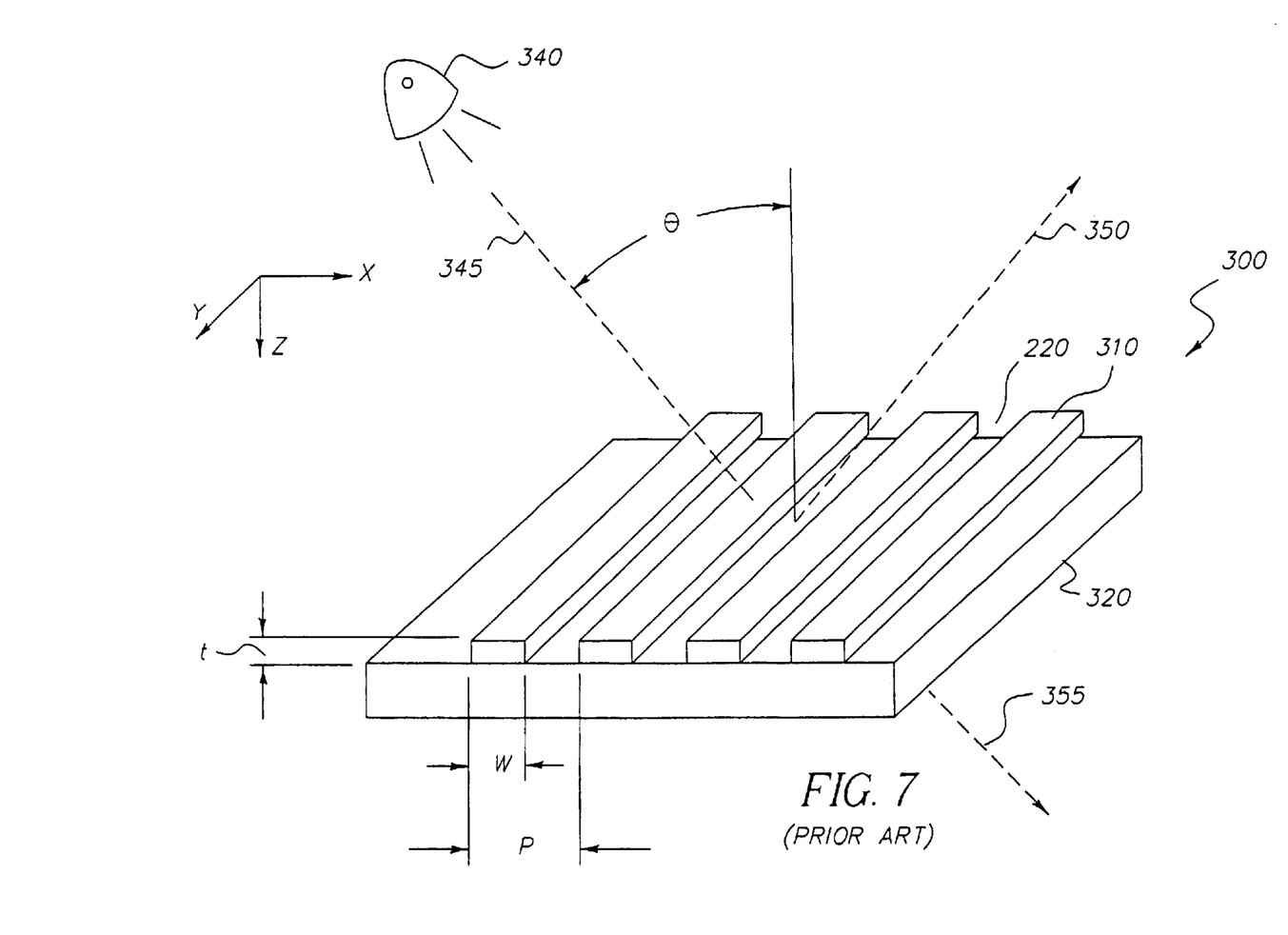
FIG. 7 shows a perspective view of a prior art wire grid polarizer.

There are also alternate approaches for designing the optical layers 170 of the micro-mechanical polarization modulator. For example, the design of spatial light modulator array 50 can be constructed to provide an optic 200 with polarization altering optical structures other than sub-wavelength form-birefringent wave plates. In particular, FIG. 7 shows a basic prior art visible wavelength wire grid polarizer as discussed in U.S. Pat. No. 6,122,103. The wire grid polarizer 300 is comprised of a multiplicity of sub-wavelength parallel conductive electrodes (wires) 310 with separating grooves 220 supported by a dielectric substrate 320. This device is characterized by the grating spacing or pitch or period of the conductors, designated (p); the width of the individual conductors, designated (w); and the thickness of the conductors, designated (t). Nominally, a wire grid polarizer uses sub-wavelength structures, such that the pitch (p), conductor or wire width (w), and the conductor or wire thickness (t) are all less than the wavelength of incident light (λ). A beam of light 345 produced by a light source 340 is incident on the polarizer at an angle θ from normal, with the plane of incidence orthogonal to the conductive elements. The wire grid polarizer 300 divides this beam into specular non-diffracted outgoing light beams, including reflected light beam 350 and transmitted light beam 355. The definitions for "s" and "p" polarization used are that "s" polarized light is light with its polarization vector parallel to the conductive elements, while "p" polarized light has its polarization vector orthogonal to the conductive elements. In general, a wire grid polarizer will reflect light with its electric field vector parallel ("s" polarization) to the grid, and transmit light with its electric field vector perpendicular ("p" polarization) to the grid. Wire grid polarizer 300 is a somewhat unusual polarization device, in that it is an E-type polarizer in transmission (transmits the extraordinary ray) and O-type polarizer in reflection (reflects the ordinary ray). The wire grid polarizer does not quite fit the definition of a form-birefringent structure, as one refractive index is imaginary.

When such a device is used at normal incidence (θ=0 degrees), the reflected light beam 350 is generally redirected towards the light source 340, and the device is referred to as a polarizer. However, when such a device is used at non-normal incidence (typically 30°<θ<60°), the illuminating beam of light 345, the reflected light beam 350, and the transmitted light beam 355 follow distinct separable paths, and the device is referred to as a polarization beamsplitter. The detailed design of a wire grid device, relative to wire pitch (p), wire width (w), wire duty cycle (w/p), and wire thickness (t), may be optimized differently for use as a polarizer or a polarization beamsplitter.

A typical wire grid polarizer 300 used for visible wavelength applications, as manufactured by Moxtek Inc. of Orem UT, has subwavelength wires 310 with a wire pitch (p) of ~140 nm, or ~$\lambda$/4 for visible light. The typical device also has a wire duty cycle (w/p) of ~0.5, and a wire thickness (t) of 100–200 nm. This means that the wire thickness to wire width aspect ratio is a modest ~2:1. The dielectric substrate 320 is typically a borofloat glass of ~0.8 to 3.0 mm thickness. Wires 310 are nominally metallic, and may be constructed with aluminum, silver, gold, nickel, or chrome (for example). While the transmitted contrast (Tp/Ts) can be very high (1,000:1 or more), the reflected contrast (Rs/Rp) is relatively low (~30:1).

Figures 8, 9:
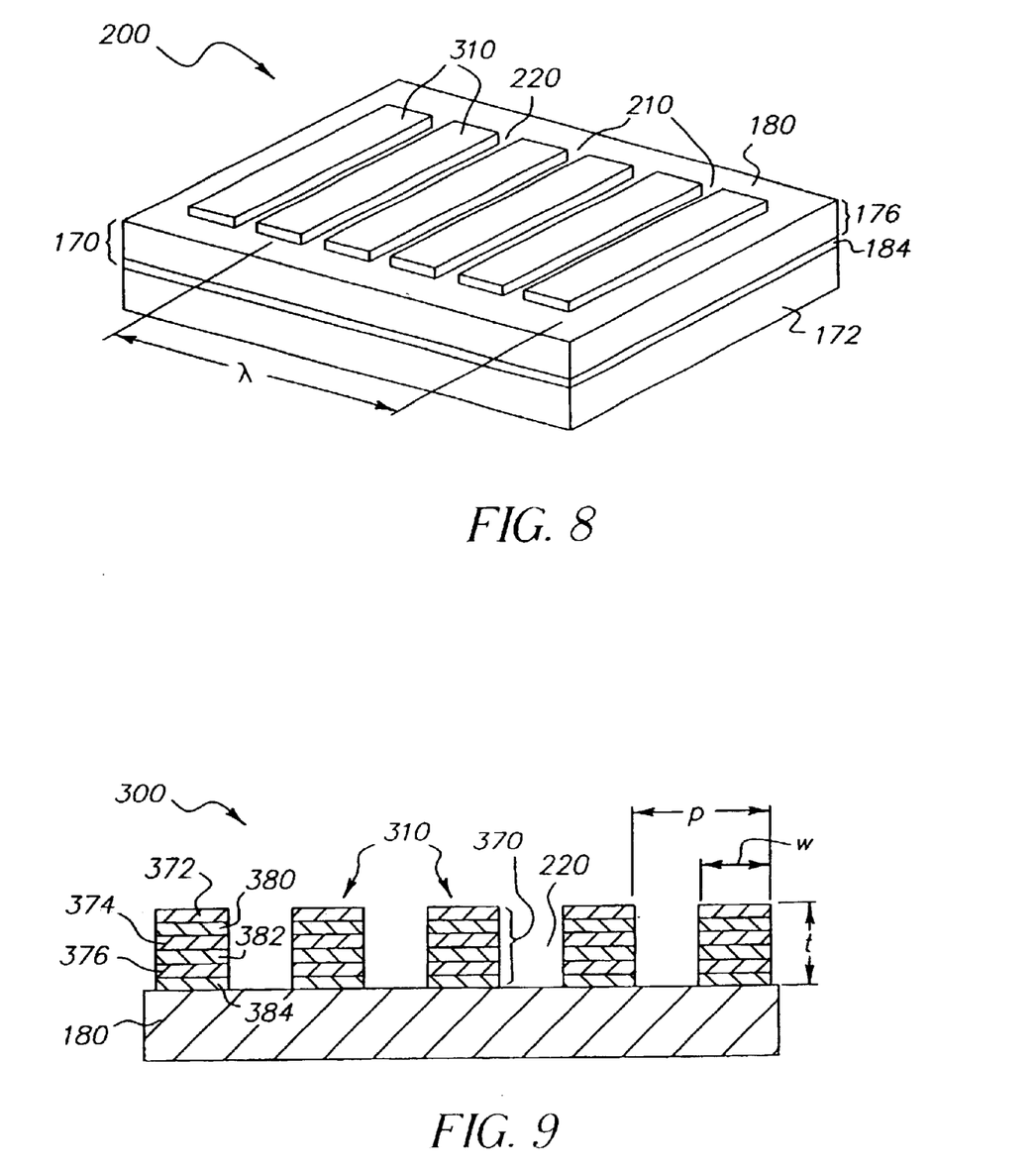
FIG. 8 shows a perspective view of a polarization optical layer with an alternate construction as a wire grid polarizer.
FIG. 9 shows a side view in cross section of a polarization optical layer with an alternate construction as a subwavelength optical structure with stratified internal layers of different materials.

Accordingly, the micro-mechanical polarization modulator can be constructed as shown in FIG. 8 with an optic 200 using a polarization optical layer 176 with an optical microstructure 210 constructed as a wire grid polarizer with wires 310 and grooves 220. This is in contrast to the prior example, where optic 200 had a polarization optical layer 176 that formed a waveplate with a dielectric optical microstructure 210 as was shown in FIG. 5. In this instance, where the optic 200 for modulator 100 is a wire grid polarizer, the polarization optical layer 176 comprises the pattern of parallel electrically conductive wires 310 fabricated on a dielectric layer 180. The optical layers 170 then comprise both polarization optical layer 176 and a light absorbing layer 184, both of which are fabricated on support 172. In accordance with most deposition processes, the dielectric layer 180 of the polarization optical layer 176 may only be many (5–100) microns thick, as compared to the ~1.0 mm substrate thickness of the typical macro-optical wire grid polarizer. Considering the description of the operation of a standard wire grid polarizer 300, relative to FIG. 7, the equivalent to the "p" polarized transmitted light beam 355 is absorbed by light absorbing layer 184 in optic 200 of FIG. 8. Obviously, the heat generated by this light absorption can cause problems unless it is properly removed from the device. However, when optic 200 is a wire grid polarizer, rather than a wave plate retarder, the angular resolution (gray scale control) should be increased, as there will be twice the number of potential steps from On State to Off state.

Although the two structures, where optic 200 is a waveplate (FIG. 5), and where optic 200 is a wire grid polarizer (FIG. 8) look similar, they are actually quite different. The fact that wire grid polarizer uses wires 310 made as thin metal strips, vs. the optical micro-structures 210 made with thin dielectric strips, means that the optical response mechanisms are fundamentally different, as the wire grid device is a polarizer, while the waveplate is a retarder. Additionally, the actual micro-structures are optimized differently, relative to the groove depth (t) and other parameters.

Figure 1B:
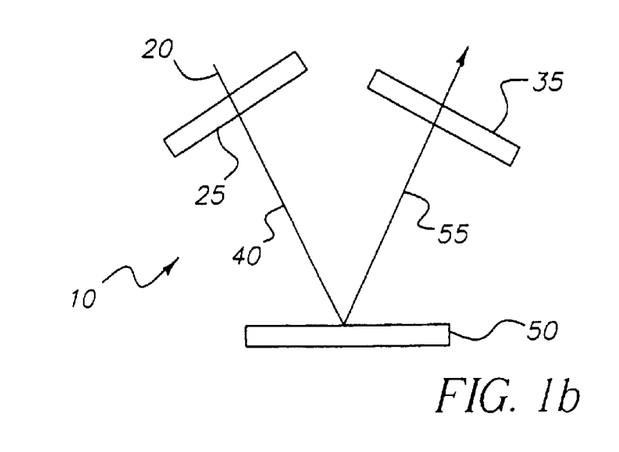
FIG. 1b shows a view in cross section of an alternate modulation optical system, containing an alternate spatial light modulator of the present invention, showing its operation upon incident light.

In addition, the construction of a modulation optical system 10 using a spatial light modulator array 50 with modulators 100 constructed with an optic 200 that is a polarizer (such as a wire grid polarizer) is different than the prior case where optic 200 is a waveplate. When optic 200 is a waveplate, it is ideal if polarization beamsplitter 30 transmits one polarization (typically "p") while reflecting the other (typically "s"). However, when optic 200 is a polarizer, modulation optical system 10 is, for example, constructed as shown in FIG. 1b, without a polarization beamsplitter, but with the polarized incident light beam 40 introduced from off-axis, and with the modulated light beam 55 exiting also at a nominally non-normal angle. In this case, the typically large acceptance angle (+/−20° or more) of the wire grid polarizer, means that modulation optical system 10 can be constructed in this fashion, while still allowing relatively fast optical systems.

Notably, as discussed in commonly-assigned copending U.S. patent application Ser. No. 09/799,281, filed Mar. 5, 2001, entitled Wire Grid Polarizer; by Kurtz et al., a resonance enhanced tunneling effect can be used to design a better wire grid polarizer. In particular, as discussed in the paper "Transparent, Metallo-Dielectric, One-Dimensional, Photonic Band-Gap Structures" in J. App. Phys. 83 (5), pp. 2377–2383, Mar. 1, 1998, by M. Scalora et al., a photonic bandgap structure can be designed using an optical microstructure comprising a stratified arrangement of thin metal layers and thin dielectric layers, such that resonance enhanced tunneling dramatically increases the transmission through the metal layers, even if these layers are several skin depths thick. In the Scalora paper, this effect is used to provide enhanced light transmission within prescribed optical bandpass regions, while the other wavelengths are blocked. But as discussed in the above application, this concept can be extended to the design of a broad wavelength wire grid polarizer which provides enhanced contrast.

This alternate concept for a wire grid polarizer 300 is shown in FIG. 9, in which the sub-wavelength wires 310 are constructed on a dielectric substrate 320 with a stratified intra-wire substructure 370 comprising alternating metal layers (372, 374, and 376) and dielectric layers (380, 382, and 384). Resonance enhanced tunneling of "p" polarized light through the stratified structure of thin dielectric and thin metal layers shown in FIG. 9 increases the transmission (Tp) for this light. However, the reflection of the "s" polarized light (Rs) can also be increased. As a result, the use of a stratified intra-wire substructure 370 comprising alternating metal layers (372, 374, and 376) and dielectric layers (380, 382, and 384) can cause both the transmitted (Tp/Ts) and reflected (Rs/Rp) contrasts to increase. The number, thickness, and order of the various metal layers and dielectric layers can be adjusted to optimize the performance.

This same concept can be adapted for use in modulator 100, by constructing the wires 310 of optical micro-structure 210 within optic 200 as a polarizer with a stratified wire structure using the intra-wire substructure 370 of FIG. 9. Of particular significance for modulator 100, is the ability of the stratified wire structure to significantly enhance the reflected contrast (to 200:1 or greater). As previously, with regards to FIG. 8, a polarization optical layer 176 is provided with an optical micro-structure 210 as a combination of (stratified) wires 310, separating grooves 220, and a dielectric layer 180. The stratified wires 310 are fabricated on the dielectric layer 180, which is in turn fabricated on light absorbing layer 184 and support 172.

As yet another alternative for providing the optic 200 for modulator 100, the paper "Design, fabrication, and characterization of form-birefringent multilayer polarizing beam splitter," by R. Tyan et al., and published in *JOSA A*, vol. 14, no. 7, pp. 1627–1636, July 1997, discusses a useful concept for a form-birefringent polarizer. The Tyan device is in some ways physically similar to the wire grid polarizer 300 of FIG. 9, which has the sub-wavelength wires 310 constructed on a dielectric substrate 320, with a stratified intra-wire substructure 370 comprising alternating metal layers (372, 374, and 376) and dielectric layers (380, 382, and 384).

However, in the Tyan device, the equivalent to the metal layers 372, 374, and 376 are not metallic, but are dielectric layers with different properties from dielectric layers 380, 382, and 384. The Tyan device also functions as a polarizing beam splitter, reflecting "s" polarization, while transmitting "p" polarization. The device of the Tyan paper was optimized for use in the near infrared (~1.5 μm), rather than in the visible. While the concept is presumably extendable to the visible wavelength region, the required thickness (t) and aspect ratios of the optical micro-structures would increase, making fabrication comparatively more difficult. Moreover, the polarization contrast, wavelength response, and angular acceptance are significantly more limited than the equivalent wire grid device.

It may also be possible that optic 200 can be constructed with a polarization optical layer 176 that does not utilize a optical micro-structure 210, such as the waveplate/retarder of FIG. 5, or the wire grid polarizer of FIG. 8. Of course, any alternate method for providing polarization optical layer 176 should lend itself to fabrication methods compatible with miniaturization and patterning. In particular, it may be possible to provide polarization optical layer 176 as a properly designed polarization sensitive optical thin film coating. It is however difficult to obtain significant polarization differences in transmission or reflection over a large wavelength band at normal incidence with optical thin film coatings. Such an alternate approach may have better success if the optic 200 is used on spatial light modulator array 50 within a modulation optical system 10 of the sort shown in FIG. 1b, where the polarized incident light beam 40 is incident at non-normal incidence. It would not be expected that such a device would have as uniform a response with angle as the equivalent device with an optical micro-structure 210.

The invention has been described in detail with particular reference to certain preferred embodiments thereof. It will be understood, however, that variations and modifications can be effected within the scope of the invention as described above, and as noted in the appended claims, by a person of ordinary skill in the art without departing from the scope of the invention. For example, although a spatial light modulator having a plurality of modulators (or pixels) is described, a device with a single pixel comprised of a micro-mechanical actuator with an integrated polarization modulation means may be useful in certain applications. In addition, although the term micro-motor has been described as being comprised of a rotor and a stator, other types of micro-mechanical actuators may be employed in the invention. For example, actuators that extend and contract to rotate the polarization optical layer to different positions, or use levers or micro-gear mechanisms, are all within the scope of the invention. Likewise, it should be understood that while the discussion of the use and design of the spatial light modulator has focused on optimization for use in the visible wavelength region, the concepts are applicable to other wavelength bands, and are particularly realizable in the near infra-red spectrum.

PARTS LIST

10. Modulation optical system
20. Incident light beam
21. Polarized light beam
25. Pre-polarizer
30. Polarization beamsplitter
32. Polarizing filter layer
35. Polarization analyzer
37. Reflected light beam
40. Transmitted polarized incident light beam
50. Spatial light modulator array
51. Drive signal
55. Modulated light beam
70. Projection lens
100. Modulated or pixel
105. Micro-motor
110. Substrate
112. Intermediate layer
120. Air gap
130. Flange bearing
132. Lower flange
134. Upper flange
136. Mask
138. Light shield
140. Stator
142. Stator pole
144. Stator lead
160. Rotor
162. Rotor pole
164. Ground plane
166. Insulating layer
170. Optical layers
172. Support
174. Reflective layer
176. Polarization optical layer
180. Dielectric layer
184. Light absorbing layer
200. Optic
205. Dielectric material
210. Optical micro-structure
220. Grove
230. Mesa
240. System polarization axis
245. Local polarization axis
300. Wire grid polarizer
310. Parallel conductive electrodes (wires)
320. Dielectric substrate
340. Light source
345. Beam of light
350. Reflected light beam
355. Transmitted light beam
370. Intra-wire substructure
372. Metal wire
374. Metal wire
376. Metal wire
380. Dielectric layer
382. Dielectric layer
384. Dielectric layer

What is claimed is:

1. A modulation optical system for providing high contrast modulation of an incident light beam comprising:

a pre-polarizer for pre-polarizing said beam of light;

a polarizing beamsplitter;

a micro-mechanical reflective spatial light modulator having a plurality of individual modulators each of said modulators comprising an optic with a polarization optical layer which alters a polarization state of said pre-polarized light beam to provide an image bearing beam;

a plurality of micro-motors rotationally coupled to each of said polarization optical layers wherein one micro-motor is coupled to one polarization optical layer; and a polarization analyzer.

2. The modulation optical system of claim 1 wherein each of said micro-motors comprises a stator with a series of stator poles and a rotor with a series of rotor poles.

3. The modulation optical system of claim 2 wherein said polarization optical layers are formed on top of said rotors.

4. The modulation optical system of claim 2 wherein:

said polarization optical layers are comprised of structures which are spaced apart within sub-wavelength distances, and which exhibit form birefringence and function as a waveplate providing a known retardation phase change; and a reflective layer located beneath each of said polarization optical layers and attached to a rotor by means of a support.

5. The modulation optical system of claim 2 wherein:

said polarization optical layers comprise a wire grid polarizer with a pattern of alternating wires and grooves spaced apart at sub-wavelength distances; and a light absorbing layer located beneath each of said polarization optical layers and attached to a rotor by means of a support.

6. A modulation optical system for providing modulation of an incident light beam comprising:

a pre-polarizer for pre-polarizing said beam of light;

a micro-mechanical reflective spatial light modulator having a plurality of individual modulator pixels each comprising an optic with a polarization optical layer which alters a polarization state of said pre-polarized light beam to provide an image bearing beam;

wherein said incident light beam is incident on said micro-mechanical reflective spatial light modulator at a non-normal angle of incidence;

wherein said incident beam of light is reflected from said micro-mechanical reflective spatial light modulator at a non-normal angle;

a polarization analyzer; and wherein each of said modulator pixels comprise a micro-motor with a stator with a series of stator poles and a rotor with a series of rotor poles.

7. The modulation optical system of claim 6 wherein said polarization optical layers are formed on top of said rotors.

8. The modulation optical system of claim 6 wherein:

said polarization optical layers comprise structures spaced apart within sub-wavelength distances, which exhibit form birefringence and function as a waveplate, providing a known retardation phase change; and a reflective layer located beneath each of said polarization optical layers, and attached to a rotor by means of a support.

9. The modulation optical system of claim 6 wherein:

said polarization optical layers comprise structures spaced apart within sub-wavelength distances, which comprise a wire grid polarizer, with a pattern of alternating wires and grooves; and a light absorbing layer located beneath each of said polarization optical layers, and attached to said rotors by means of a support.

* * * * *